United States Patent [19]
Michael et al.

[11] Patent Number: 6,167,150
[45] Date of Patent: Dec. 26, 2000

[54] METHOD AND APPARATUS FOR DETECTING EXTENDED DEFECTS IN AN OBJECT

[75] Inventors: David J. Michael, Framingham; Lowell D. Jacobson, Grafton; Nelson Tarr, Cambridge, all of Mass.

[73] Assignee: Cognex Corporation, Natick, Mass.

[21] Appl. No.: 09/122,507

[22] Filed: Jul. 24, 1998

[51] Int. Cl.[7] .................................................. G06K 9/00
[52] U.S. Cl. .......................... 382/149; 382/199; 348/125
[58] Field of Search ..................................... 382/145, 147, 382/149, 153, 204, 205, 225, 256, 266, 199; 348/125–126, 128

[56] References Cited

U.S. PATENT DOCUMENTS 5,081,689 1/1992 Meyer et al. ............................... 382/22
5,204,910 4/1993 Lebeau ..................................... 382/152

OTHER PUBLICATIONS

Ballard, Dana H. and Brown, Christopher M., "Boundary Detection", Computer Vision, 1982, pp. 119–148, Prentice–Hall Inc., Englewood Cliff, NJ.

Canny, John, "a Computational Approach to Edge Detection", IEEE Transactions on Pattern Analysis and Machine Intelligence, vol. PAMI–8, No. 6, Nov. 1986, pp. 679–689.

Primary Examiner—Bhavesh Mehta
Attorney, Agent, or Firm—Tracy M. Calabresi

[57] ABSTRACT

A method and apparatus is provided that detects extended defects in a surface, by detecting connected features and classifying the connected features so as to identify defects. A method and apparatus is described which processes an image for edges, thresholds the edge and then determines whether the edges are connected features by examining the orientation of the edges compared to their neighboring edges. Application of the method to read/write heads in a storage-drive assembly application is disclosed. Particular enhancements of the method and apparatus for that application are described, including classifying the defects on a head based on their relationship to the boundary of the head, and applying hysteresis thresholding or diffusion to identify cracks which interfere with the function of the heads.

24 Claims, 11 Drawing Sheets

| j=1 | 0 | 0 | -70 | -70 | -20 | -20 |
|---|---|---|---|---|---|---|
| 2 | -20 | -20 | 0 | 0 | 0 | 0 |
| 3 | -30 | -90 | 0 | 70 | 20 | 20 |
| 4 | -80 | 0 | 80 | 40 | 30 | 0 |
| 5 | -70 | 0 | 20 | 20 | 0 | 0 |
| 6 | 140 | 100 | 30 | 0 | 0 | 0 | i=1  2  3  4  5  6

FIG. 11C

| j=1 | 0 | 60 | 70 | -70 | -40 | -20 |
|---|---|---|---|---|---|---|
| 2 | 20 | 40 | 140 | -140 | -20 | -40 |
| 3 | 30 | 80 | 0 | -70 | -40 | -20 |
| 4 | 80 | 0 | -80 | -20 | -30 | 0 |
| 5 | 70 | -140 | -40 | -20 | 0 | 0 |
| 6 | 0 | -100 | -30 | 0 | 0 | 0 | i=1  2  3  4  5  6

| 0 | 60 | 99 | 99 | 45 | 28 |
|---|---|---|---|---|---|
| 28 | 45 | 140 | 140 | 20 | 40 |
| 42 | 120 | 0 | 99 | 45 | 28 |
| 113 | 0 | 113 | 45 | 42 | 0 |
| 99 | 140 | 45 | 28 | 0 | 0 |
| 140 | 141 | 42 | 0 | 0 | 0 |

METHOD AND APPARATUS FOR DETECTING EXTENDED DEFECTS IN AN OBJECT

FIELD OF THE INVENTION

This invention relates to machine vision, and particularly to defect detection.

BACKGROUND

Figure 1:
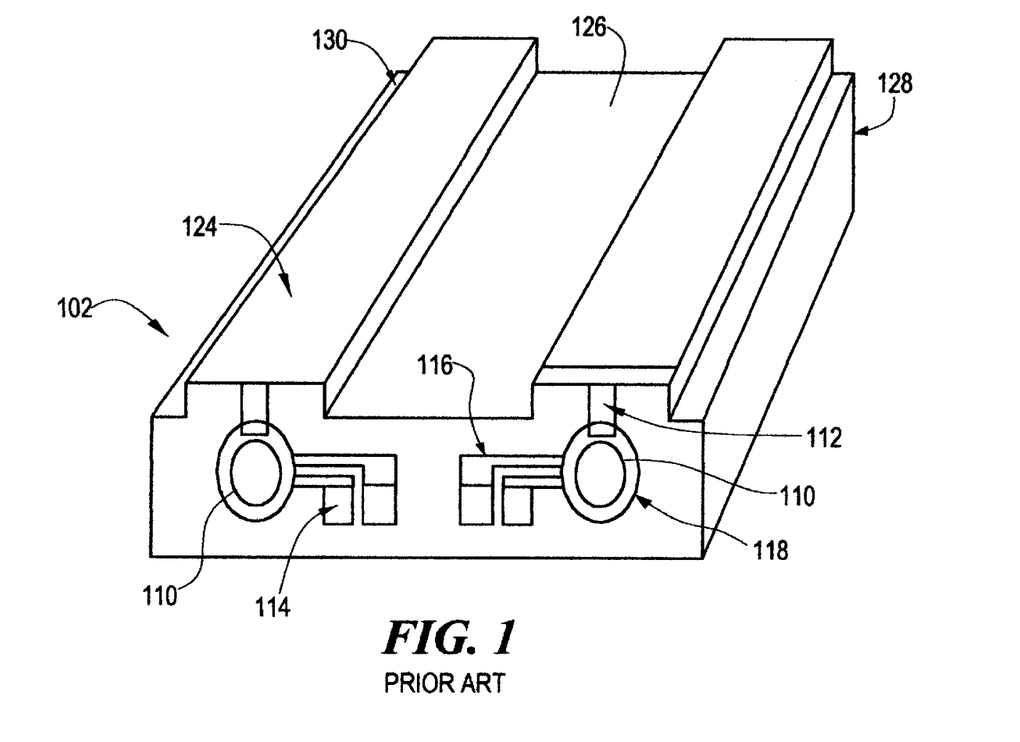
FIG. 1 is a perspective view of a head, not drawn to scale.

The electronics industry manufactures disk heads, also known as sliders, or tape heads, collectively referred to herein as heads, which are part of a storage-drive assembly. The heads facilitate reading and writing of information to or from a storage media, such as a computer disc or video-cassette-recorder tape. FIG. 1 is a perspective view of a head, not drawn to scale. In a simple magnetic-disc-drive assembly, the head 102 is mounted on an arm above a platter. The platter is a magnetic medium and the head 102 is a transducer. The head 102 in conjunction with the spinning platter converts electrical signals from a computer, television, or camcorder, for example, into an electromagnetic field for reading or writing the information to or from the platter.

Essentially, a head interacts with the storage-drive assembly to induce an energy field. Many different schemes using a head can produce the necessary field to read from and write to a particular media. For instance, a magneto-optical drive assembly uses temperature to change polarity of magneto particles to store information, and a storage-drive assembly incorporating phase-change technology uses a laser to heat the recording layer of the media to change the structure between crystalline and non-crystalline states. As the head's function is primarily as a transducer within these assemblies, cosmetic non-uniformities do not necessarily affect function.

Figure 2:
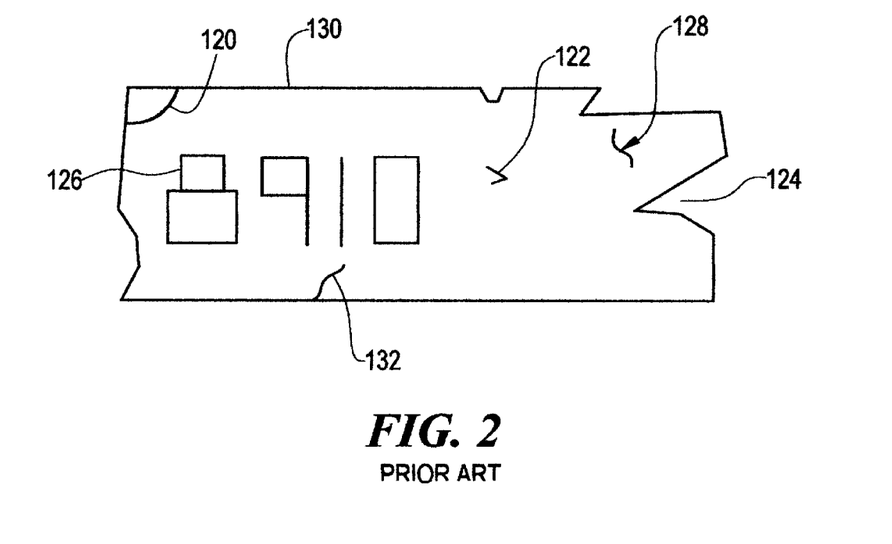
FIG. 2 is a top view of a side surface of a head of FIG. 1, not drawn to scale.

Consequently, without appreciably affecting functionality of the storage-drive assembly, the heads can have several non-uniformities, such as chips 124, which are areas of missing material, and can contain identifying information, such as serial numbers 126, as illustrated in FIG. 2. FIG. 2 illustrates the letter-end surface 128 of the head 102, not drawn to scale.

Manufacturers define differently which non-uniformities are unacceptable and, therefore, constitute a defect. Generally, however, manufacturers typically allow some non-uniformities in non-functional regions, regions without pattern deposited material, while restricting almost all non-uniformities in functional regions, such as copper coils 110, photoresist insulators 118, pole-tips 112, leads 116, and pads 114. For instance, cracks 132 and 122 may constitute defects depending upon the location of the cracks 132 and 122. Cracks are breaks in the material of the head, and are typically two microns or more across on a head of typically a few millimeters in area.

One common defect is a crack 120 that touches two edges of the head. Cracks that extend to the edge 130 of the head 102 can grow during operation of the assembly. A grown crack 120 can cause portions of the head 102 to break and fall onto parts of the storage-drive assembly rendering it inoperable or damaging the information stored therein. As such, heads containing these cracks 120 typically must be removed before they are assembled in a storage-drive assembly.

Unlike other typical defects, which are routinely found on the head 102 using machine vision, such as contamination, delamination, and incomplete pads, detecting the cracks 120, 132, 122 typically has proven difficult to automate. The difficulties arise because the textured surface of heads provides an over abundance of directional information making the identification of the cracks 120, 132, 122 difficult. In addition, difficulty also arises because not all cracks on the surface require the head to be discarded. Removing a head with only acceptable cracks inadvertently reduces yield.

Figure 3A:
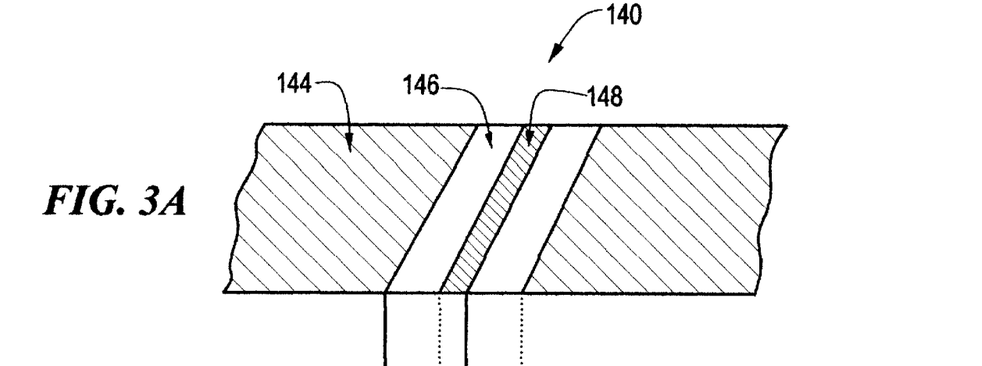
FIGS. 3A and 3B are a cross-sectional perspective view of a deep crack on a head and its intensity histogram, respectively.
Figure 3B:
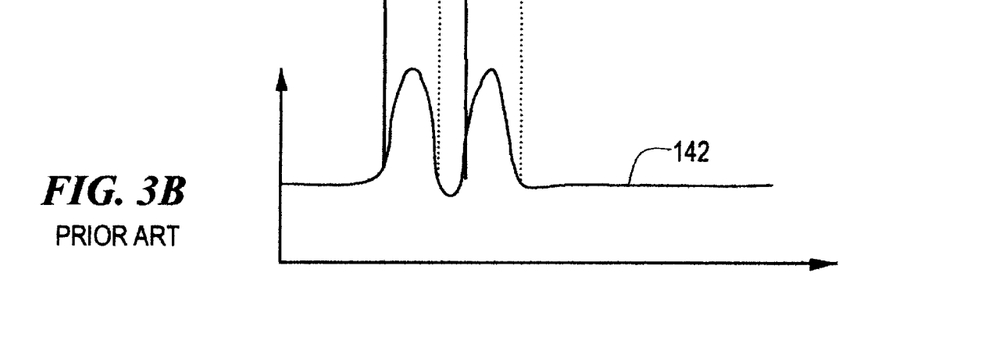
Figure 3C:
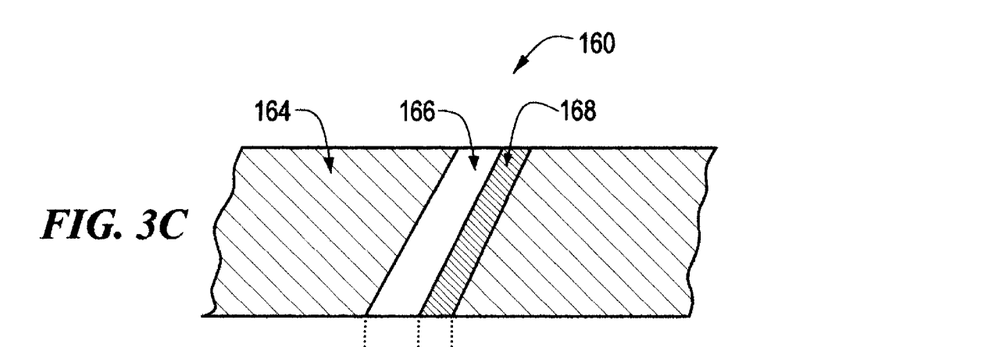
FIGS. 3C and 3D are a cross-sectional perspective view of one form of a sharp crack on a head and its intensity histogram, respectively.
Figure 3D:
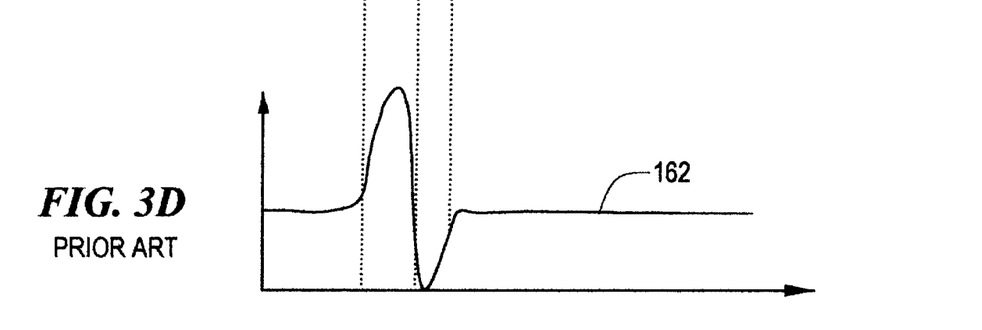
Figure 3E:
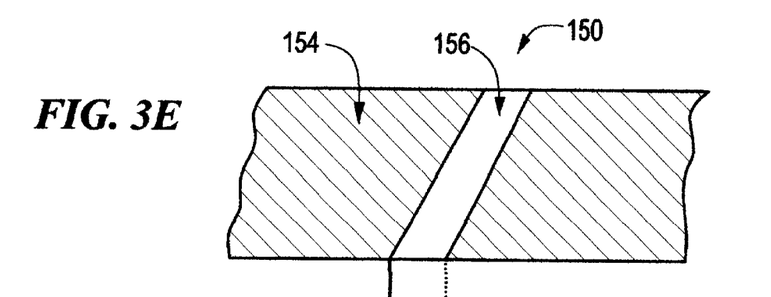
FIGS. 3E and 3F are a cross-sectional perspective view of a bright crack on a head and its intensity histogram, respectively.
Figure 3F:
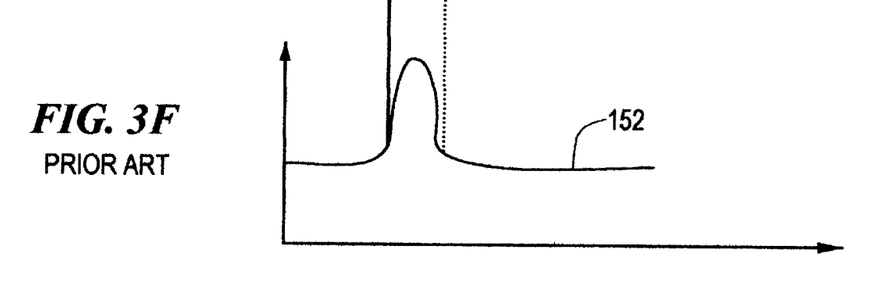
Figure 3G:
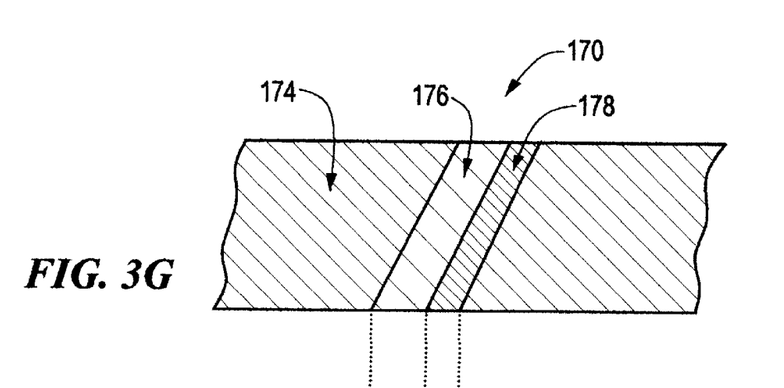
FIGS. 3G and 3H are a cross-sectional perspective view of one form of a dull crack on a head and its intensity histogram, respectively.
Figure 3H:
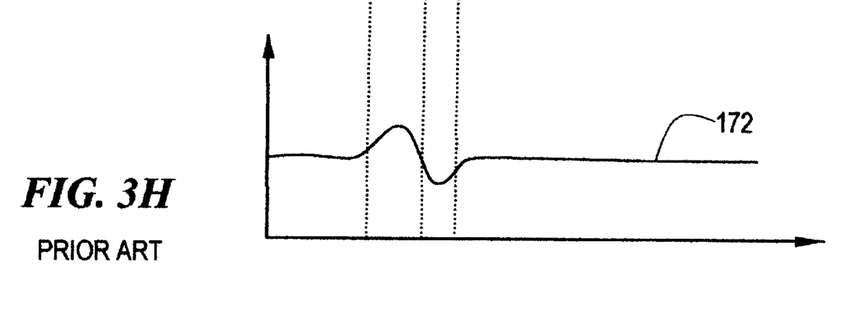

Further, vision techniques that rely on intensity are typically inadequate because the cracks 120, 122, 132 exhibit various intensity patterns. For instance, FIGS. 3A and 3B illustrate a cross-section of a deep crack 140 and its intensity histogram 142, which shows a change in intensity from an intermediate area 144 to a bright area 146 to a slightly darker area 148, then to the bright area 146 and finally back to the intermediate area 144. FIGS. 3E and 3F are an illustration of a cross-section bright crack 150 and its intensity histogram 152. Unlike the deep crack 140, the bright crack 150 does not have the slightly darker area 148. Not only can the pattern of intensities vary for cracks 120, but also the degree of intensity changes can vary as shown by FIGS. 3C, 3D, 3G, and 3H. A cross-section of a dull crack 170 and a sharp crack 160 have the same change in polarity from a light area 166, 176 to a dark area 168 and 178, but the change is not to the same extent, as illustrated by comparing the two intensity histograms 162 and 172.

The combination of varying intensity profiles of the cross-section of cracks, the textured surface of heads that provides an abundance of directional information, the presence of fairly similar sized cracks that are not of consequence, and the extraneous marks or non-uniformities has hindered, if not stopped, the automatic detection of the cracks.

Consequently, this process typically has been performed manually. However, manual inspection is very expensive.

SUMMARY

In a general aspect, the invention is a method and apparatus for automatically detecting extended defects in a surface of an object. The method detects edges in the image, and determines whether the edges are connected using the magnitude and the orientation of the edge. The magnitude is thresholded using a low threshold to retain edges of defects having a small cross-section. Optionally, the magnitude of the edges can be thresholded using hysteresis thresholding. The orientation of the neighboring edges are compared, and are determined to form a connected edge when the angle of the neighboring edges are within a predetermined range of each other. The invention recognizes that the neighboring edge pixels can potentially be part of a single defect when their edge angles are within the predetermined range, where the range is a measure of the neighboring edge's compatibility. Once connected edges are detected, the method classifies each connected edge as a defect or as inconsequential. The manufacturer can reject or accept the object based on that classification.

In a preferred embodiment, a connected edge is classified as a defect depending upon a relationship of each connected edge to a boundary of the object. More specifically, extents of the connected edges are gauged, and each (connected edge is classified as a defect if the connected edge substantially meets the boundary.

In other aspects, the method detects connected features within the image without limiting the evaluation to edges.

The method and apparatus is so robust that not only can it detect extended defects on a uniform surface of an object, but it can also detect extended defects on a non-uniform surface. Therefore, this method is particularly useful for detecting defects in a surface of a read/write head.

The invention solves some of the deficiencies in the prior art. One of the advantages of the invention is the ability to detect small-extended defects on the order of several microns in cross-section. Another advantage is the ability to detect defects on a non-uniform surface, such as a textured or patterned surface. Another advantage is the ability to discriminate between defects. Further, all these advantages are achieved using a machine vision system in a commercially viable manner while replacing slower, more expensive manual inspection.

In further aspects, the invention provides an apparatus in accord with the method described above. The aforementioned and other aspects of the invention are evident in the drawings and in the description that follows.

BRIEF DESCRIPTION OF THE DRAWINGS

The invention will be more fully understood from the following detailed description, in conjunction with the accompanying figures, wherein.

DETAILED DESCRIPTION OF THE DRAWINGS

The method finds connected features of an object in an image, but it is particularly useful in finding connected edges on a surface of a head. Though this is the form of a preferred embodiment and will be described as such, this embodiment should be considered illustrative, and not restrictive.

Figure 5:
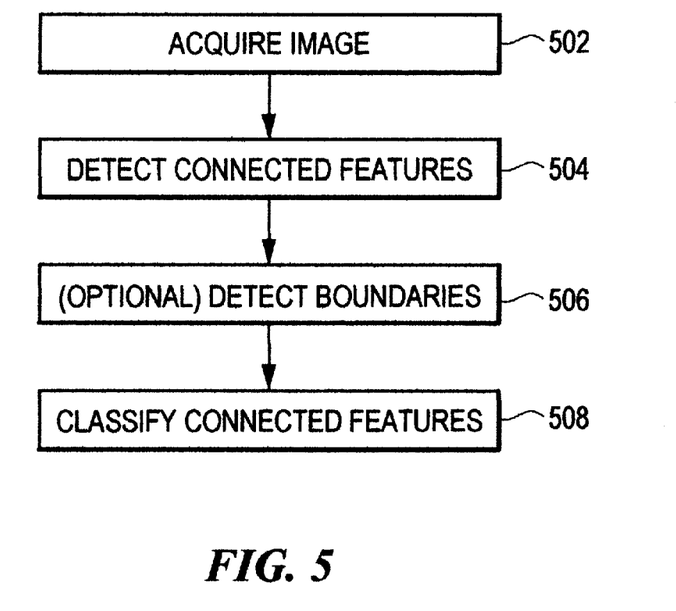
FIG. 5 is a flowchart of one embodiment of the method of the invention.

The first step of the method is to acquire an image of the head (502). The steps of one embodiment of the method of the invention are shown in the flowchart of FIG. 5. The steps of the method will be shown in this specification by denoting the reference numbers of the steps in parentheses.

Figure 4:
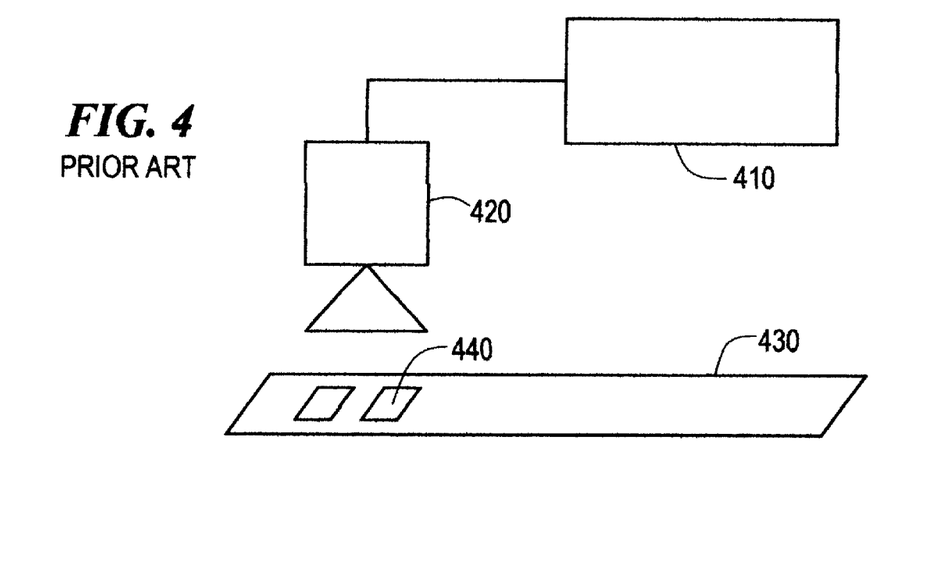
FIG. 4 is a schematic representation of a machine-vision system inspecting heads on a conveyor belt.

The head is imaged (502), for instance, by digitizing an image of the head taken using a head inspection-line. A side-view of a head-inspection line is illustrated in FIG. 4. In this application, heads 440 are transported horizontally by a platform 430. A camera 420 or other image-digitizing device is triggered to acquire an image of the head 440 over one or more fields of view. The image is then transmitted to a machine vision system 410 for processing. As more than one surface of the head is imaged, the head is often carried in a tray (not shown) that is flipped during testing to expose each surface of the heads 440 to the camera 420.

The image consists of an array of pixels and is a digital representation of an object, such as the head. A pixel is a picture element characterized by a grey value.

After the image is acquired and digitized as an array of pixels, the method detects features that are "connected" (504). A feature is a portion of an image of the head. Connected features are a series of pixels that have similar traits, such as similar intensities among neighboring pixels, for example. In a preferred embodiment, connected features are a series of neighboring edge pixels whose angles are compatible, as is further described with reference to FIG. 9.

After the connected features are detected, the connected features are classified (508). Connected features that may interfere with the performance of the head are classified as defects, and the head is then removed from the head inspection-line. Heads containing only connected features that are inconsequential to performance pass inspection.

Figure 6A:
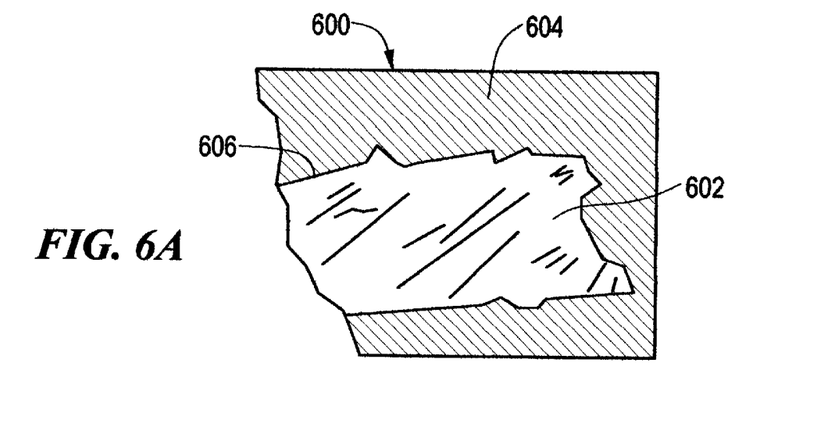
FIG. 6A is a side view of an image of a head not drawn to scale.

In a preferred embodiment, the connected features are classified based on their relationship to a boundary of the head. FIG. 6A is a representation of an image 600 of a head 602 and its boundary 606 against a background 604. The boundary 606 can be detected (506) using numerous vision techniques, such as Boundary Tracker™ a software tool sold by Cognex Corporation.

Figure 6B:
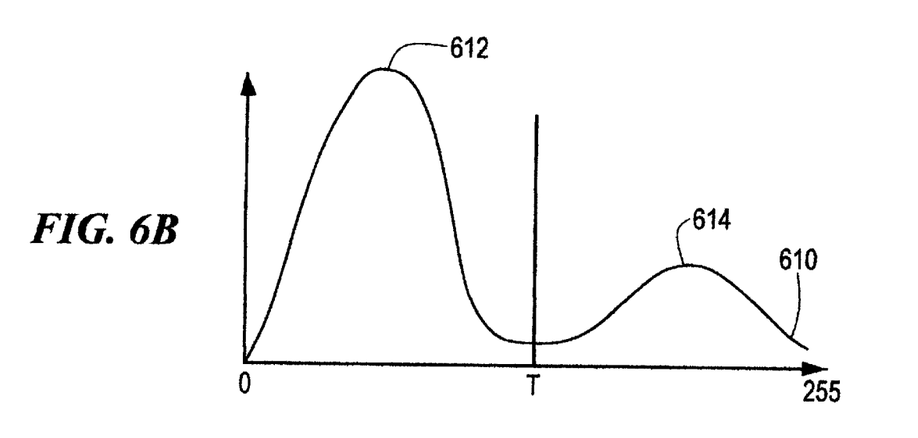
FIG. 6B is a representation of an intensity histogram of FIG. 6A.

Another technique to detect the boundary is to segment the image 600 of the head 602 into foreground, which contains the head 602, and background 604. The foreground and the background 604 are divided by the boundary 606, which is a high contrast edge. This technique uses a histogram 610, as is illustrated in FIG. 6B, which is a graphic representation of pixels in the image 600, to segment, or separate, objects from other areas in the image 600.

The histogram 610 is a frequency representation of the intensity of pixels in the image 600. The intensity of each of the pixels is the grey value of the pixel. Dark areas correspond to grey values closer to 0, while bright areas correspond to higher grey values, typically up to 255 for an 8-bit representation of intensity. Grey values are graphed on the abscissa against the number of pixels in the image sharing that grey value, which is graphed on the ordinate.

The histogram 610 shows groupings of pixels that comprise the head 602, which is the bright object in the image 600, and the pixels that comprise: the lighter background 604. The peak 614 represents the most common grey value in the head 602, while the peak 612 represents the most common grey value in the background 604. A threshold, T, is typically chosen between the peaks 614 and 612. The process of choosing the threshold can be refined according to an application's requirements by methods known in the art.

Figure 6C:
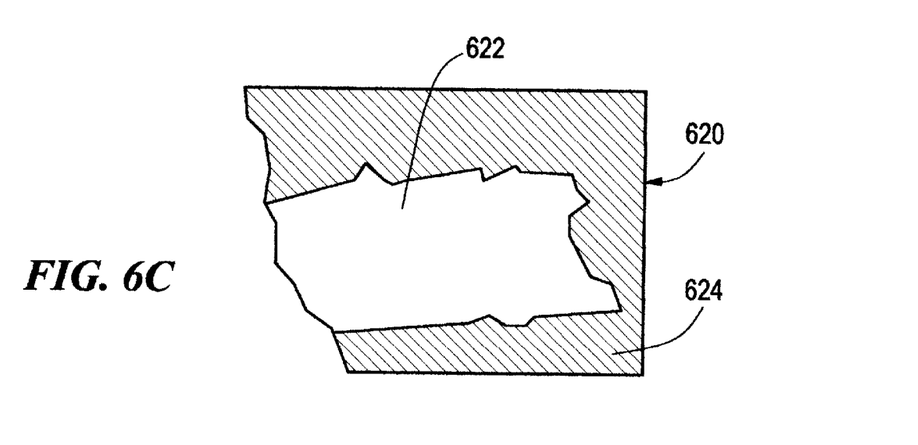
FIG. 6C is a representation of a binarized image of the head of FIG. 6A using the threshold determined from FIG. 6B.

Using the threshold, the image 600 is processed into a binary image 620 illustrated in FIG. 6C. Specifically, the grey value of each pixel of the image 600 is compared against the threshold. If the grey value of the pixel is greater than the threshold, the pixel is considered an object pixel and the grey value of that pixel is reassigned a high value, such as 255. Otherwise, the pixels are considered background pixels and their grey values are reassigned a low value, such as 0. Consequently, all the pixels in the binarized image 620 have one of two grey values, which label each pixel as part of the object 622 or part of the background 624.

Any part of the object can be segmented in this manner when the part has a quantifiable difference in intensity compared to the rest of the image. For instance, the rails 124 in the head 102 of FIG. 1 can be separated from the remainder of the image, which would be a background, the relief area 126, and the edges 128. Consequently, the connected feature can be classified based on its relationship to the rail boundary instead of the head boundary.

Figure 7:
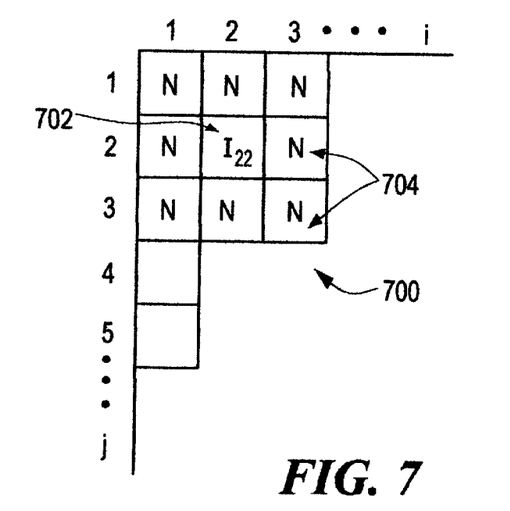
FIG. 7 is a representation of pixels in a portion of an image and particularly the image illustrates a pixel's neighbors.

Once the image 600 is binarized, a boundary pixel is easily identified as each pixel that is an object pixel whose grey value is different from one or more of its neighbors. FIG. 7 illustrates a pixel 702, designated $I_{2,2}$, and its neighbors 704, designated by an N in the image 700 of i by j pixels. The boundary 606 includes all the boundary pixels, which can be stored as an array $B_x$, containing the position $I_{i,j}$ of each boundary pixel in the image.

Once the boundary pixels and the connected features are detected, each connected feature is then classified as an acceptable non-uniformity or an unacceptable defect (508). The classification will change for each application. For instance, scratches, which are connected features, are found using this method. Scratches are man-made non-uniformities. Scratches, however, are not as relevant to quality control of heads as are the cracks. Furthermore, other known machine vision methods can by used to find scratches, as they typically do not vary in direction as much along their length as cracks.

In a preferred embodiment directed at classifying cracks, a crack that extends substantially to the boundary is a defect that is unacceptable. In the storage-drive assembly application, this classification is advantageous because it only fails heads with cracks that may interfere with performance, while passing as usable parts heads with other connected features that do not extend to the edge, such as chips, scratches, labeling, or other non-uniformities, for instance.

With the connected features as input, more than one method can determine whether the connected features meet the boundary. For instance, one method is to compare the location of each boundary pixel against the pixel locations of the connected features and generate pixel locations that are a member of both the boundary pixels and the connected features.

Figure 8:
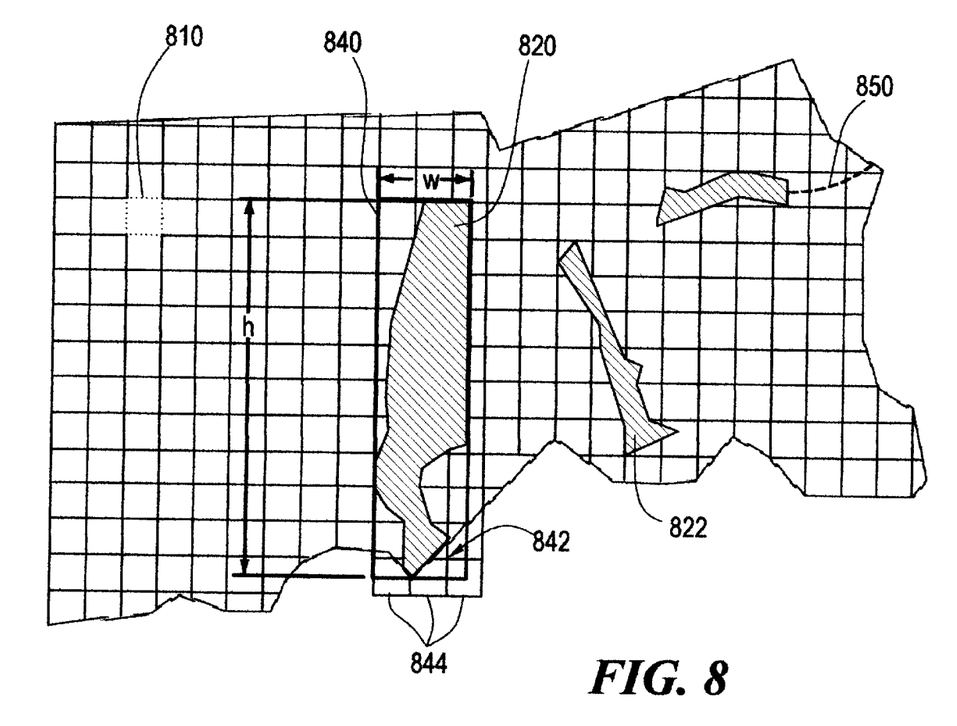
FIG. 8 is a top view of a head having connected features surrounded by bounding boxes and illustrating connected features being diffused.

A quicker and preferred method is performing a connectivity analysis on the connected feature to gauge the extents of the connected feature using Blob™, a software tool sold by Cognex Corporation. The connected features are input to Blob as the object of interest. With that information, Blob creates a second image containing only the object of interest and returns, if prompted, the extents of a bounding box 840, an instance of which is shown in FIG. 8, which is representation of an image of a head not drawn to scale. The bounding box 840 surrounds the connected feature 820.

Next, the location of the boundary pixels 842 within or near the bounding box 840 are compared with the location of the pixels 844 of the connected feature that define the side of the bounding box 840. If any of the pixel positions are the same, the connected feature 820 is classified as a defect in the storage-drive assembly example.

Figure 14A:
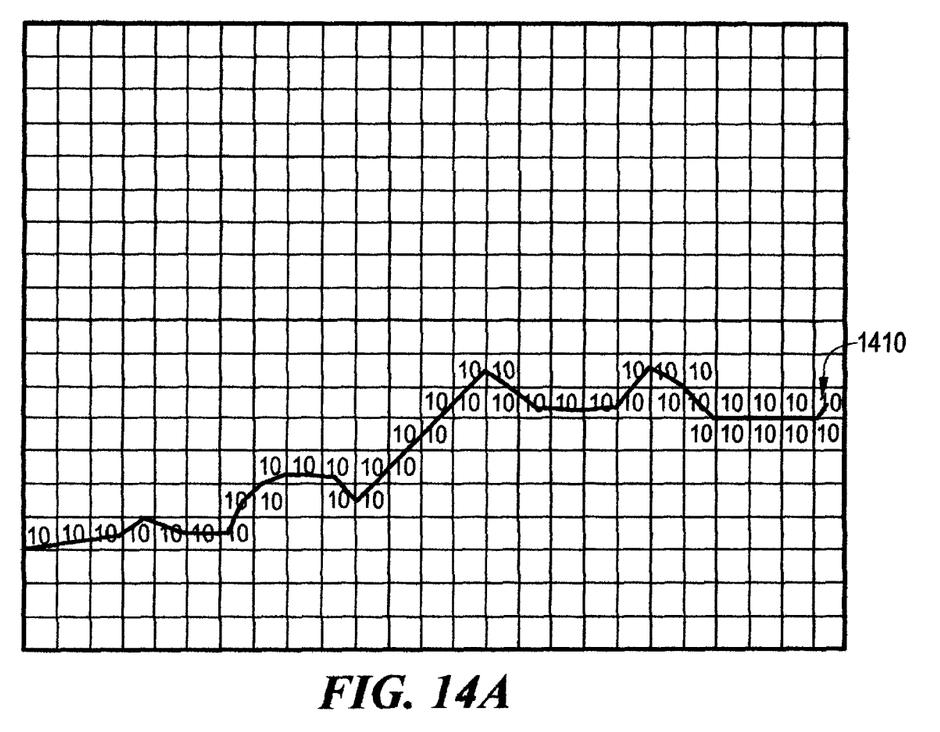
FIG. 14A is a representation of an image of a boundary of the top view of the head of FIG. 8.
Figure 14B:
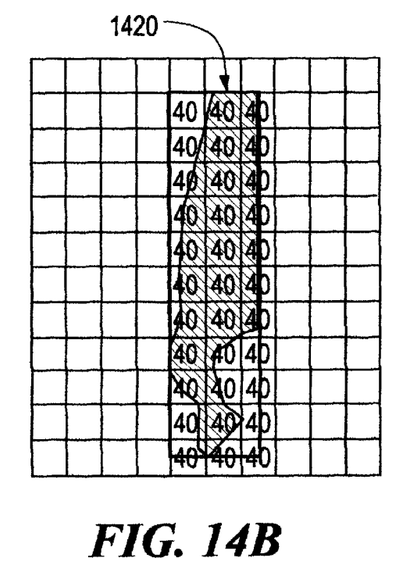
FIG. 14B is a representation of an image of a bounding box and a connected feature of FIG. 8.
Figure 14C:
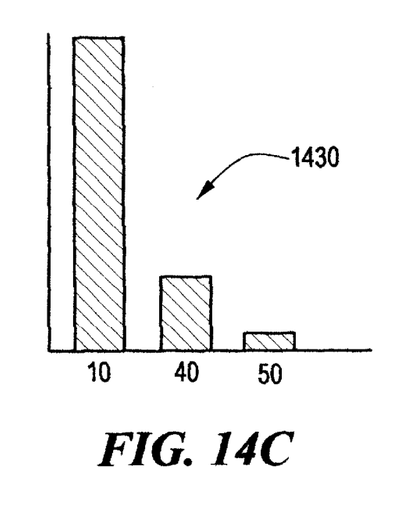
FIG. 14C is a histogram of the sum of image of FIG. 14A and FIG. 14B. The histogram has bins representing the frequency of the boundary, the bounding box and the connected feature, as well as the intersection of the boundary with the bounding box or the connected feature.

FIGS. 14A, 14B, and 14C illustrate one method of comparing the pixel positions. First, an image of the boundary is created, wherein the boundary pixels have a known grey value, such as 10; part of this image 1410 is illustrated in FIG. 14A, not drawn to scale. Next, a second image is created containing a connected feature and optionally the bounding box, wherein the pixels of the connected feature and the bounding box are given a new grey value, such as 40; this image 1420 is illustrated in FIG. 14B, not drawn to scale. The images 1410 and 1420 are added, and a histogram of the added images is constructed, such as the histogram illustrated in FIG. 14C. In this example, the histogram 1430 has an occupied bin at 10, representing the boundary, and at 40, representing the connected feature and the bounding box. If the bounding box or connected feature touch the boundary, then the bin representing their sum, which in this example is 60, will also be occupied (i.e. have a magnitude greater than zero). Whether the connected feature touches the boundary can be ascertained by examining the bin whose grey value corresponds to the sum of the boundary and the connected feature.

Whether pixels in the connected feature must correspond to boundary pixels to be classified as a defect varies with each application. For instance, the connected feature 822 does not have to touch the boundary, but instead can be near the boundary 830 and still be classified as a defect. Optionally, morphology techniques expand the boundary or the potential defect so that the pixels near each other will instead correspond to one another. Morphology techniques are well known in the art.

Other characteristics can be used to classify the connected features as defects, such as aspect ratio, area, length or curvature of a connected feature, for example. A connected feature can be classified using any characteristic alone or in combination with a relationship of the connected feature to head, such as the relationship to the boundary or to the functional region of the head. For example, a crack can be defined as a defect depending upon its length, if it meets the boundary, if the ends turn towards the edge of origin, and/or if the crack is located within a functional region.

How a connected feature is classified depends on the requirements of the application. Any of the parameters returned by Blob or parameters that can be derived from the image may be used for the classification.

However, before classifying a connected feature, the connected features have to be detected (504). One method to detect connected features is described by the flowchart of FIG. 9, where reference numbers denoting steps of the method are placed in parenthesis within the detailed description. The method detects connected features having a length that exceeds the cross-section of the feature by at least substantially three times the distance, i.e. extended.

Figure 10:
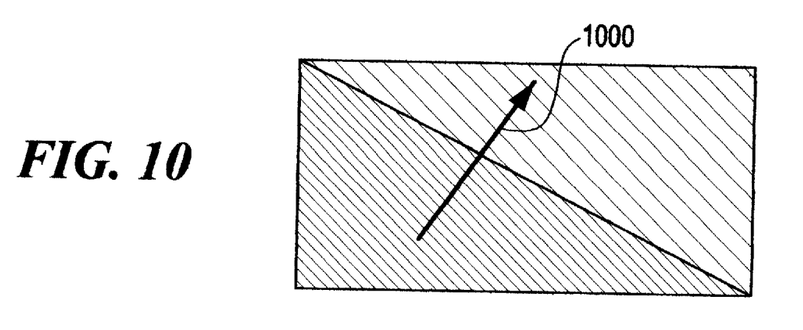
FIG. 10 is a graphical representation of an orientation of an edge.

In a preferred embodiment, the connected features are connected edge pixels. An edge pixel is a pixel that has a different grey value from one or more of its eight neighboring pixels. Each edge pixel is associated with an edge magnitude and an edge direction 1000 as illustrated in FIG. 10. The magnitude of an edge pixel is the difference in grey values between the image pixels that underlie the edge pixel. The direction 1000 of an edge pixel is typically expressed as the angle of a line that is drawn perpendicular to a tangent to the edge at the edge pixel position. An array of edge pixels (or edge elements) is called an edge map.

Figure 9:
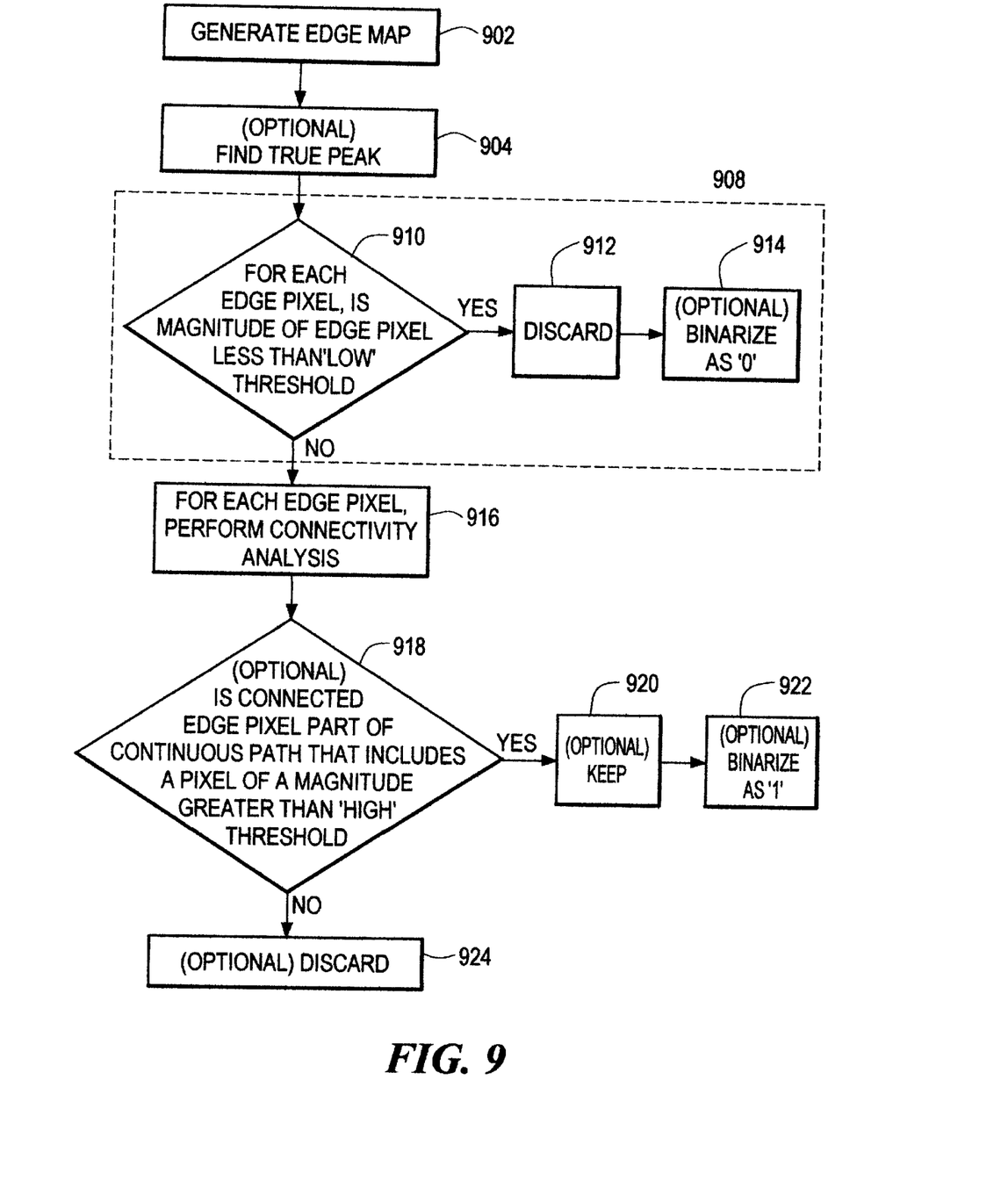
FIG. 9 is a flowchart of one embodiment of detecting connected features in the method of FIG. 5.

The first step of the embodiment is to generate the edge map (902). To generate the edge map, an edge operator is applied to the image of the head. Any operator that provides edge magnitude and orientation information is sufficient, such as a texture operator, a quadrature operator, or a multi-resolution wavelet decomposition operator, for example. However, in the storage-drive assembly application concerned with detecting cracks on heads, the cracks that are being detected are approximately two microns across. When such small cracks are imaged in an inspection line, often the cracks are as small as one pixel across in the image.

Figure 11A:
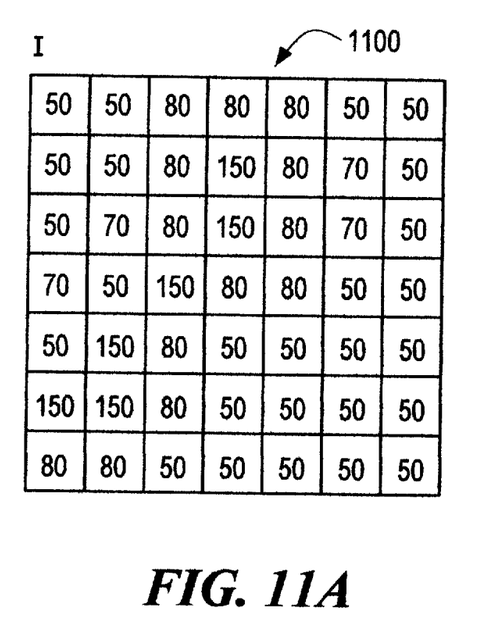
FIG. 11A is an illustration of an image of an edge, not represented to scale.
Figure 11B:
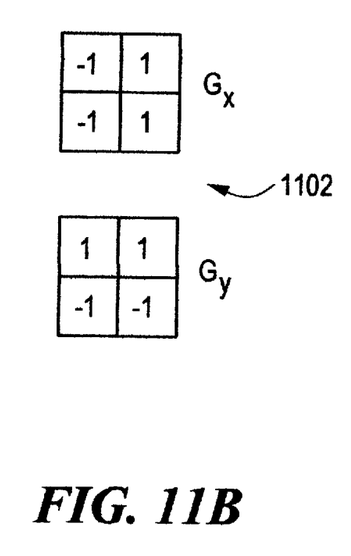
FIG. 11B is an example of a pair of operators used in the embodiment of FIG. 9.
Figure 11C:
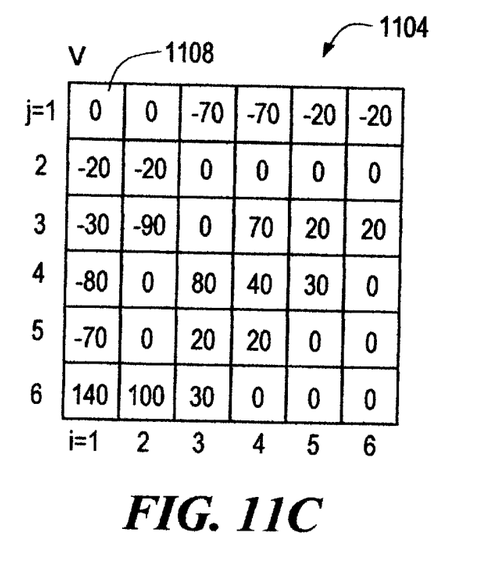
FIGS. 11C and 11D are an illustration of vertical components and horizontal components produced using the horizontal and vertical operator, respectively, of FIG. 11B on the image of FIG. 11A.
Figure 11D:
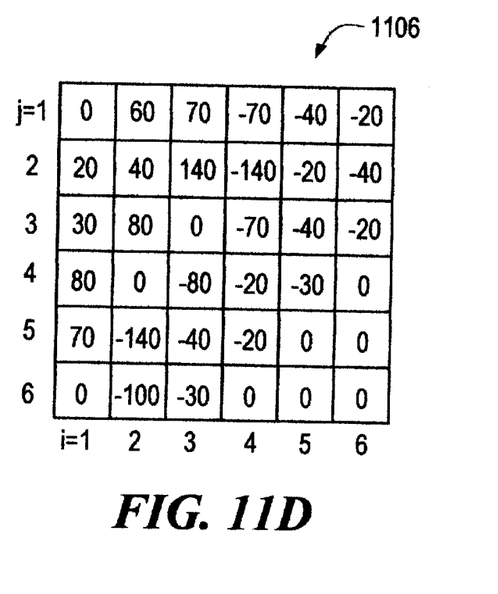

To detect cracks with a one pixel-wide cross-section, it is preferred to use an operator having a small kernel width, such as the horizontal and vertical operator illustrated in FIG. 11B. The operators are applied to each pixel in the image, such as the image 1100 illustrated in FIG. 11A. The application of the operators generates, respectively, a vertical component map 1104 and a horizontal component map 1106. Each value in these maps represents the gradient calculated for the position that lies between four pixels in the image 1100 upon which the operator was applied. Accordingly, the resulting vertical component map 1104 and horizontal component map 1106, which are 6 by 6 pixels, are one pixel smaller than the image 1100 in each dimension, which is shown as 7 by 7 pixels.

Figure 11E:
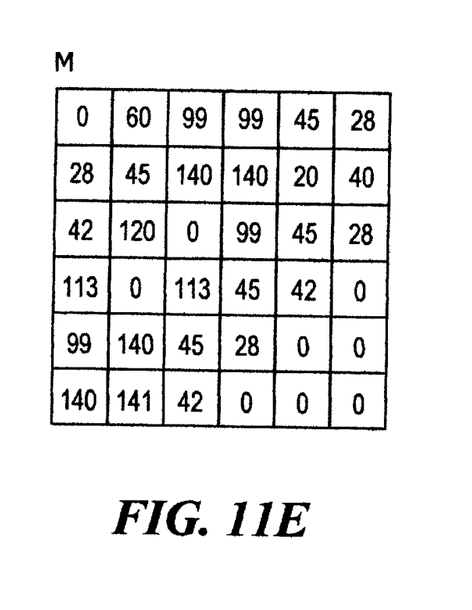
FIG. 11E is a representation of a magnitude space resulting from the combination of the vertical components and the horizontal components of FIGS. 11C and 11D, respectively.

The edge map includes a plurality of edge pixels, each edge pixel being associated with a magnitude value and an orientation value. An example of the magnitude value is shown in FIG. 11E. The magnitude value for each edge pixel is a function of the corresponding horizontal component and the vertical component for that edge pixel. The magnitude is given by the equation:

$$m_{ij} = \text{sqrt}(x_{ij}^2 + y_{ij}^2),$$

where $m_{ij}$=the magnitude value at the position M(i,j), $x_{ij}$=the horizontal component value at the position X(i,j), and $y_{ij}$=the vertical component value at the position Y(i,j).

Figure 11F:
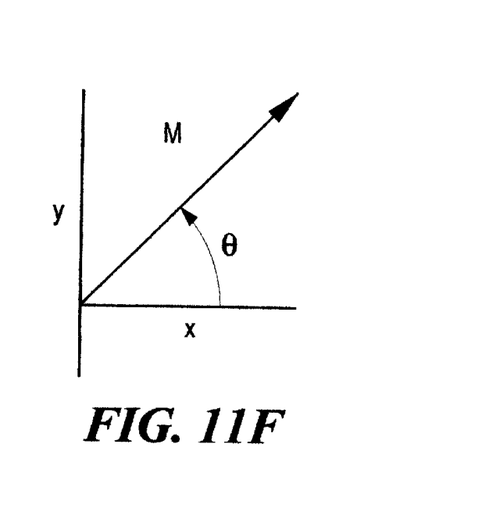
FIG. 11F is a geometric representation of an edge angle relative to its edge magnitude.

The orientation value is typically expressed as the angle of a line which is drawn perpendicular to a tangent to the edge at the edge pixel position, and in one implementation is given by the following equation: angle (i,j)=ArcTan (Y(i,j),X(i,j)). A graphical depiction of the angle of each edge as it relates to the magnitude is shown in FIG. 11F.

Small operators generate a series of edges for most local grey-level changes. The one-pixel wide cracks may only generate one-pixel wide edges. However, slightly larger cracks and linear intensity changes are viewed as local grey-level changes by the operator, and, therefore, will produce a series of edges or strokes, when processed by the small operators.

Accordingly, to eliminate spurious and superfluous edge pixels, and to consequently improve the speed and accuracy of the invention, optionally an edge pixel reduction technique is employed. In step (904), all but "true peak" edge pixels are eliminated from the edge map of step (902). True peak is also known in the art as non-maximum suppression.

Figure 12:
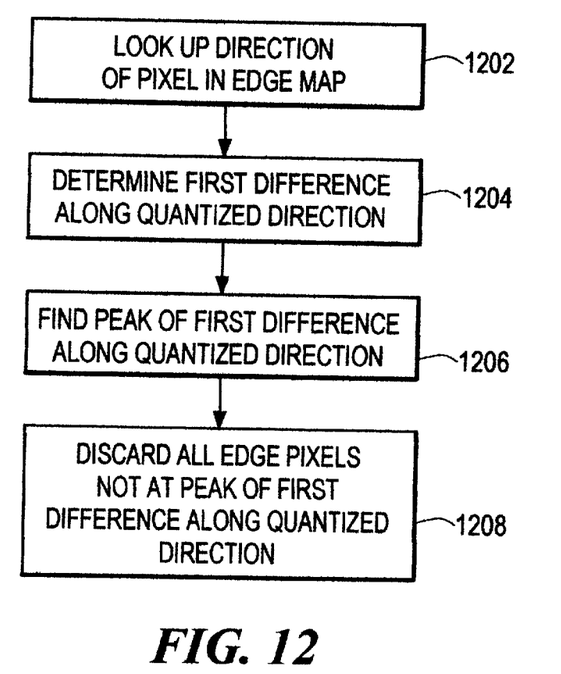
FIG. 12 is a flowchart of the process of detecting a true edge.

If an edge map is viewed as a terrain, wherein the edge magnitude at each (i,j) position of the edge map is the height (z) above a plane at z=0, then the subset of "true peak" edge pixels are those edge pixels that form the peak of one or more extended ridges in the terrain. Referring to FIG. 12, to eliminate all but the "true peak" edge pixels, all edge pixels that are not coincident with a local maximum or peak of the edge map are eliminated, where the local maximum is taken along the direction of each edge pixel. The direction of the edge pixel is quantized, for example, such that the direction is one of N, NE, SE, S, S, W or NW. To eliminate all but the "true peak" edge pixels, the direction of each edge pixel in the edge map is looked up (1202). Then, the first difference of the corresponding image pixels is computed along the quantized direction of the edge pixel (1204). In a preferred embodiment, this first difference is looked up in a table of first difference results obtained from previously computed edge detection operations. Next, the peak (i.e., maximum) of this first difference taken along the direction of the edge pixel is found (1206). If the peak is not coincident (i.e., in overlapping relationship) with an edge pixel, that edge pixel is discarded (1208).

In a preferred embodiment, in the cases where the "peak" consists of two or more edge pixels of the same edge magnitude for a given quantized direction, then it is useful to reduce the number of these edge pixels. If it is assumed that, for edge pixels of the same edge magnitude for a given quantization direction, edge pixels disposed farther along the given quantization direction are retained in preference over "nearer" edge pixels. For example, if the given quantization direction is W (right-to left), then for two otherwise equivalent neighboring edge pixels, the left-most edge pixel will be selected as the "true peak" edge pixel.

Alternatively, edge pixels corresponding to linear intensity changes can be minimized by using an operator with a larger kernel width, such as the texture operator, instead of by "true peak" detection. A larger operator can discriminate between linear intensity changes and edges more precisely because the larger operator processes a larger area of the image at one time. Specifically, the larger operator has more data points, and, therefore, can determine not only the slope between two points, but also whether the slope changes (i.e. whether the change is linear). The smaller operator has only two data points in each direction to use to generate one value, the horizontal component or the vertical component.

Thus, the small operators 1102 cannot discriminate between linear intensity changes and edges.

The resulting edge map contains edge pixels corresponding to the cracks. Further, edge pixels corresponding to the benign cracks, other defects, patterns, or texture are also in the edge map. The surface of the head or any non-uniform surface generates extraneous edge pixels, where non-uniform as used herein includes a textured surface, a patterned surface, a surface with extraneous marks or any combination of these features.

Returning to FIG. 9, each of the edge pixels remaining on the edge map is then thresholded (908). Edge pixels with a magnitude less than a low threshold are discarded (912), while pixels having a magnitude greater than the low threshold are evaluated for connectivity (916). Optionally, the discarded pixel is binarized (914), i.e., converted to logic value '0'.

A low threshold is used to keep edges corresponding to defects with a small cross-section. The small cross-section of the cracks will more likely be missed if the threshold is not kept low. The low threshold keeps edge pixels representing defects as well as noise, particularly on a textured surface. However, the low threshold discards a portion of the edge pixels that represent very high-frequency noise.

To determine if neighboring edge pixels are connected, the orientation value of each of the edge pixels over the low threshold is compared with its neighbor's orientation values. Each of the edge pixels on the edge map is compared with its neighbors in a raster order. If the edge angle of two neighboring edge pixels is within a range of degrees, such as plus or minus 20°, the edge pixels are deemed connected because the angles are "compatible", that is, the edge pixels are considered capable of being part of one extended defect.

Figure 13:
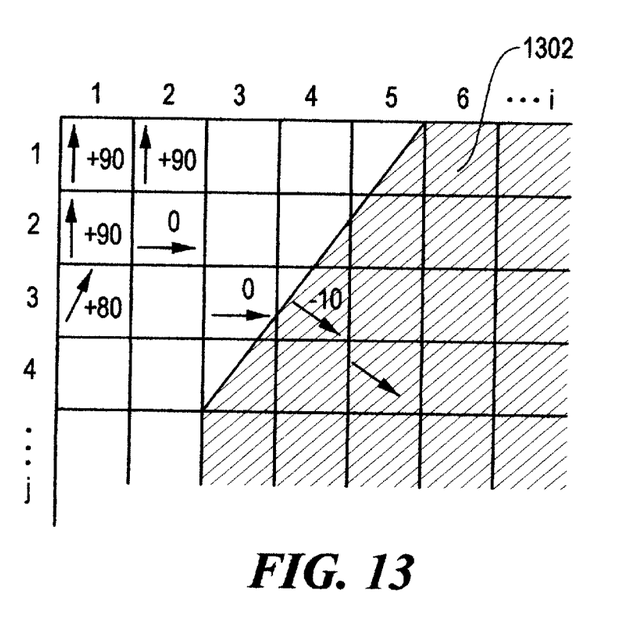
FIG. 13 is a representation of an edge map's angle space.

For instance, in FIG. 13 edge pixels $I_{1,1}$ and $I_{1,2}$ are connected edge pixels because edge pixel $I_{1,1}$ and edge pixel $I_{1,2}$ have an edge angle of 90°. $I_{3,3}$ and $I_{4,3}$ are also connected edge pixels for any range equal to or greater than plus or minus 10°, where $I_{3,3}$ has an edge angle of 0° and $I_{4,3}$ has an edge angle of –10°. The range of angles can vary for each application. However, practically the largest variation is approximately 90°. Empirically, the preferred range is 45°.

To ensure only proper connected edges are identified, only edge pixels in front of the angle of a neighboring pixel can be connected. For example, if the relative positions between the neighboring pixels was not examined, edge pixel $I_{1,1}$ and $I_{2,1}$ both having an edge angle of 90° would be designated as a connected edge, when they are parallel edges, not connected edges.

Only the neighboring pixels that fall within the maximum of range of plus or minus 90° from the orientation of the connected edge are in front of the connected edge. For instance, the three neighboring pixels of the connected edge of edge pixel $I_{3,3}$ and its neighbor $I_{4,3}$ are the pixels to the E, SE and S, which in this case is edge pixels $I_{4,4}$, $I_{5,3}$, and $I_{5,4}$. These pixels fall within the maximum of range of plus or minus 90° from the orientation of –10° of the edge pixel $I_{4,3}$. The range is designated by the shaded area 1302. By accounting for which pixel is in front, edge pixel $I_{4,3}$ and its neighboring edge pixel $I_{5,2}$ could not be connected.

Further, to minimize the number of comparisons necessary, once one edge pixel is determined to be connected to one of its neighbors, the raster order is replaced with a more directed search. The more directed search only examines neighbors within the range of the previously found connected edge pixels. For instance, after edge pixel $I_{3,3}$ and its neighbor $I_{4,3}$ are identified as a connected edge, then only neighbors $I_{5,3}$, $I_{5,4}$ and $I_{4,4}$ are examined. This process is continued for the entire edge map. After identifying the connected edges, the connected edges are classified as was described with reference to FIG. 5.

However, in a preferred embodiment before classification, the connected edges are examined against a higher threshold using an aspect of hysteresis thresholding, which is a technique well known in the art. The hysteresis thresholding, allows rejection of edges that are due to random noise without having to raise the threshold higher so that "real" edges would be missed. The cracks that cause difficulties in the head of the storage-drive assembly are longer in length and typically small in cross-section.

Hysteresis thresholding requires that at least one edge pixel in the previously identified connected edge is above a high threshold (918). If the connected edge does not contain one edge pixel with a magnitude greater than the high threshold, the connected edge is more likely than not a small line scratch, noise, or just texture, and not a crack. Therefore, the entire connected edge is discarded (924).

However, if the connected edge does have one edge pixel with a magnitude greater than the high threshold, the connected edge is kept (920) and optionally each edge pixel in the connected edge is binarized (922), i.e., converted to logic value '1'. The connected edge is binarized to reduce processing considerations when other processing still needs to be completed on the connected edge, such as gauging as previously described with reference to FIG. 6.

Optionally, the connected features that appear to not approximately touch the boundary can be extended by a process of diffusion prior to classification, so that more connected features that approximately meet the boundary can be classified as cracks. An example of a diffused connected feature 850 is shown in FIG. 8. The connected feature is diffused by repeating steps (908) through (916) of the connected feature identification process using a lower threshold in step (910). The lower threshold will enable more edge pixels to be retained. The extra edge pixels that are retained can then be classified as cracks as previously described.

Alternatively, diffusion can replace comparing each connected pixel to a high threshold and eliminate steps (918)–(924).

Other modifications and implementations will occur to those skilled in the art without departing from the spirit and the scope of the invention as claimed. Accordingly, the above description is not intended to limit the invention excerpt as indicated in the following claims.

What is claimed is:

1. A method for automatically detecting an extended defect in an object, the method comprising:

acquiring a digital image of the object;

detecting edges in the image, the edges having an angle and a magnitude; and detecting connected edges within the image using the angle and the magnitude of the edges; and classifying a connected edge as a defect based on aspects of the connected edges where the connected edge classified as the defect is one of the connected edges.

2. The method of claim 1, wherein the object has a non-uniform surface.

3. The method of claim 2, wherein the non-uniform surface is textured.

4. The method of claim 1, wherein the object is a read/write head.

5. The method of claim 1, wherein the defect is approximately at least one pixel across.

6. The method of claim 5, wherein the connected edges that are classified as defects have different intensity signatures across widths of the connected edges on the object.

7. The method of claim 1, wherein detecting connected edges within the image further includes:
detecting the connected edges as neighboring edges having a change in angle within a predetermined amount.

8. The method of claim 1, wherein detecting the connected edges within the image further includes:
comparing the magnitude of each of the edges against a threshold so as to provide remaining edges, and
detecting as the connected edges ones of the remaining edges that neighbor one another and have a change in the angle within a predetermined tolerance, being designated first connected edges.

9. The method of claim 8, wherein detecting the connected edges further includes:
comparing the magnitude of each of the edges against a decreased threshold so as to provide weaker remaining edges,
comparing the angles of the weaker remaining edges that neighbor the first connected edges and have a magnitude above the decreased threshold so as to provide compared weaker remaining edges,
detecting as the connected edges, the compared weaker remaining edges that neighbor the first connected edges and have a change in the angles within a predetermined tolerance, and
wherein classifying further includes:
gauging the extents of the connected edges, and
classifying a connected edge having an extent that substantially meets a boundary of the object as a defect.

10. The method of claim 1, wherein detecting the connected edges within the image further includes:
computing a change in the angle between approximately neighboring edges, and
performing hysteresis thresholding on the edges having the change in the angle within a predetermined amount so as to provide the connected edges.

11. The method of claim 1, wherein classifying further includes:
performing hysteresis thresholding on the connected edges so as to produce at least one remaining connected edge, the at least one remaining connected edge being classified as the defect.

12. The method of claim 1, wherein classifying further includes:
classifying a connected edge as a defect based on aspect ratio.

13. The method of claim 1, further comprising:
gauging extents of at least one of the connected edges, and
wherein classifying further includes:
classifying a connected edge as a defect based on the extents of the connected edge.

14. The method of claim 1, further comprising:
detecting a boundary of the object, and
wherein classifying further includes:
determining a relationship of at least one of the connected edges to the boundary, and
classifying a connected edge as a defect by the relationship of the connected edge to the boundary.

15. The method of claim 14, further comprising:
gauging extents of at least one of the connected edges, and
wherein classifying further includes:
classifying a connected edge as a defect if the connected edge substantially meets the boundary.

16. A method for automatically detecting extended defects in an object, the method comprising:
acquiring a digital image of the object;
detecting a boundary of the object within the image;
detecting connected features within the image; and
classifying a connected feature as a defect by determining a relationship of the connected feature to the boundary, where the connected feature classified as the defect is one of the connected features.

17. The method of claim 16, wherein detecting connected features within the image includes:
detecting edges in the image, the edges having an angle and a magnitude; and
detecting connected edges as the connected features within the image using the magnitude and the angle of the edges.

18. The method of claim 16, further comprising:
gauging extents of the connected features, and
wherein classifying further includes:
classifying a connected feature as a defect if the corrected feature substantially meets the boundary.

19. An apparatus for automatically detecting defect; in a non-uniform surface of an object, the apparatus comprising:
a digital image of the object;
boundary detecting means, adapted to detect a boundary of the object within the image;
connected feature detecting means, adapted to detect connected features within the image; and
means for classifying, in cooperation with the boundary detecting means and the connected feature detecting means, adapted to classify a connected feature as a defect by determining a relationship of the connected feature to the boundary, where the connected feature classified as the defect is one of the connected features.

20. The apparatus of claim 19, wherein the means for detecting connected features within the image further includes:
means for detecting edges in the image, the edges having a magnitude and an angle; and
means for detecting, in cooperation with the means for detecting edges, adapted to detect connected edges as the connected features within the image using the magnitude and the angle of the edges.

21. The apparatus of claim 19, further comprising:
means for gauging, in cooperation with the connected feature detecting means, adapted to gauge extents of the connected features, and
wherein the means for classifying is further adapted to classify a connected feature as a defect if the connected feature substantially meets the boundary.

22. The method of claim 1, wherein classifying further includes:
classifying more than one of the connected edges as defects based on respective aspects of the more than one connected edges.

23. The method of claim 16, wherein classifying further includes:
classifying more than one of the connected features as defects based on respective aspects of the more than one connected features.

24. The apparatus of claim 19, wherein the means for classifying is further adapted to:
classify more than one of the connected features as the defects based on respective aspects of the more than one connected features.

* * * * *